United States Patent [19]
Enderle et al.

[11] Patent Number: 4,888,877
[45] Date of Patent: Dec. 26, 1989

[54] ARTICULATING HEAD FOR A COORDINATE-MEASURING INSTRUMENT

[75] Inventors: Eckhard Enderle, Aalen; Dieter Kaufmann, Heidenheim; Müller, Gmünd-Grossdeinbach; Thomas Andrzejewski, Aalen, all of Fed. Rep. of Germany

[73] Assignee: Carl-Zeiss-Stiftung, Heidenhein/Brenz, doing business as Carl Zeiss, Oberkochen, Fed. Rep. of Germany

[21] Appl. No.: 191,392

[22] Filed: May 9, 1988

[30] Foreign Application Priority Data

Nov. 26, 1987 [DE] Fed. Rep. of Germany ....... 3740070

[51] Int. Cl.$^4$ .............................................. G01B 7/00
[52] U.S. Cl. ......................................... 33/559; 33/572; 33/561; 33/503; 33/504
[58] Field of Search ................ 33/503, 504, 505, 1 M, 33/1 MP, 1 PT, 536, 558, 559, 561, 551, 552, 553, 554, 542, 542, 572

[56] References Cited

U.S. PATENT DOCUMENTS

| | | | |
|---|---|---|---|
| 3,531,868 | 10/1970 | Stevenson | 33/503 |
| 3,750,295 | 8/1973 | Nordmann | 33/503 X |
| 3,805,393 | 4/1974 | Lemelson | 33/504 X |
| 3,944,798 | 3/1976 | Eaton | 33/504 X |
| 4,384,407 | 5/1983 | Miyamoto | 33/503 |
| 4,606,696 | 8/1986 | Slocum | 33/1 PTX |

Primary Examiner—Harry N. Haroian
Attorney, Agent, or Firm—Hopgood, Calimafde, Kalil, Blaustein & Judlowe

[57] ABSTRACT

The invention contemplates an articulating head having bearings of reproducible travel behavior, for precision angular displacment of a mounted probe-pin, about each of two orthogonal component axes of rotation. The precision of angular displacement relies upon high-resolution angle encoders for reading the instantaneous angle for each of these component axes of rotation and for reporting the same to the computer of a coordinate-measuring machine. Active position-control circuits use the angle encoders for controlling drive about the respective component axes of rotation, all in conjunction with a given program of measurements by the coordinate-measuring machine. A probe holder mounted to the articulating head can be oriented to any desired angular aspect with respect to the workpiece feature to be measured or scanned, and measurements can be made solely by controleld actuation via one or both drives on the respective axes of the articulating head, i.e., while rectilineal drives of the coordinate-measuring machine are arrested. Alignment and travel behavior of the articulation axes are determined by a calibration program and are used for correction of measurement values read from the angle-encoders of the articulating head.

18 Claims, 8 Drawing Sheets

ARTICULATING HEAD FOR A COORDINATE-MEASURING INSTRUMENT

BACKGROUND OF THE INVENTION

The present invention relates to an articulating head for a work-probe holder of a coordinate-measuring instrument, having at least two motor-driven axes of probe-holder orientation, and to a method for the coordinate measurement of workpieces by means of such an articulating head.

Articulating devices of the character indicated serve primarily to angularly orient the probe holder used for coordinate measurement of workpieces in such manner that the probe holder can be optimally employed for the desired measurement task.

Since the positions in which the probe head is oriented in the course of a measurement program must be reproducible with a high degree of precision, the articulating mechanism in articulating heads relies upon detent retention of predetermined angular orientations. The location of work-contact probe balls of the probe head are calibrated once in each of the plural detent-retainable positions of the articulating head. The probe holder can thereupon, during the course of a given measurement program, be brought into each of a plurality of different angular positions, which as a rule differ from each other by about 7.5°, without need to recalibrate a probe ball.

Articulating probe-holder devices of the indicated type are illustratively known from Federal Republic of Germany Pat. No. 2,804,398, and from corresponding U.S. Pat. Nos. 4,313,263 and 4,571,847, as well as from the following company publications:

1. "3-Dimensional Probes for Coordinate-Measuring Machines", Renishaw Plc., Great Britain, Print Identification BMM No. 1984, 8M 586.

2. Product Information "Handachse" of the Stiefelmayer Company, Esslingen, Print Identification No. 27 04 87-000970.

The advantage of the known articulating devices is that precision bearings are not necessary since the detents determine the position of the probe pin. Furthermore, no position-measurement system is required for each of a plurality of articulated orientations. On the other hand, it is disadvantageous that when using these known devices, one is restricted to given angular orientations of the probe holder. It is therefore not possible to perform active scanning motion or to have probe-holder orientation track surface geometry of a workpiece, in the course of a scanning program. Furthermore, a calibration process is necessary for each detent-retained angular position and for each scanner.

From Federal Republic of Germany Pat. No. 3,322,714, it is known to employ two-axis articulation for orienting an optical probe head over the surface geometry of a workpiece, in the course of scanning movement along a workpiece. To measure the involved angles of displacement, angle-stepping transmitters are provided in the two articulation axes. However, from this German patent, it does not appear how the coordinates of the workpiece-measurement points are determined from the linear-measurement scales of the involved coordinate-measuring instrument and from the angle-stepping transmitters of the involved two-axis articulation.

BRIEF STATEMENT OF THE INVENTION

It is the object of the present invention to provide a two-axis articulating head for a probe holder of a coordinate-measuring instrument wherein, without sacrifice of precision of measurement, an infinitely variable adjustment of the angle of rotation about either or both of the articulation axes is available for use in a given course of movement of the coordinate-measuring instrument.

The invention achieves this object by providing a two-axis articulating head which contains:

(a) bearings with reproducible travel behavior for rotation about each of the two articulation axes, (b) an angle encoder of high resolution associated with each axis of rotation, for the reporting of angular displacements referenced to the computer of a coordinate-measuring instrument, (c) active position-control circuits by which the angle encoder and the rotary drive for each of the involved axes is included in the control of the coordinate-measuring instrument, in such manner that a preset orientation of the probe holder in space is maintained via the drives of the articulating head, or that the involved workpiece is measured in a desired probe-contact mode.

These features make it possible to operate in accordance with measurement methods wherein workpiece-coordinate measurements can proceed at least in part with linear drives of the coordinate-measuring instrument arrested, i.e., solely through movement of the probe holder by means of the articulation device.

Since this articulated method of operation avoids movement of the relatively large masses of displaceable carriages in a coordinate-measuring instrument, one can obtain a shortening of measurement time and/or an increase in measurement accuracy, for many measurement tasks.

For example, when testing the shape of cylindrical surfaces (e.g., bores, etc.), such surfaces can be scanned by a work-contacting probe using rotation about one of the two axes of the articulating head and rotation about the other axis can be used for probe withdrawal. Furthermore, it is possible to actively scan the points to be measured on a workpiece by simultaneous movement about each of the two axes, while drives of the coordinate-measuring instrument are arrested.

With relatively little manufacturing expense for the bearings and the angle encoders of the articulation device, errors in measurement can occur for various reasons, as, for example, if the two axes of the articulation device are not precisely orthogonal to each other, or if they do not lie precisely in the same plane but pass each other at slight offset, or exhibit other motional deviations. However, with the invention, errors due to these circumstances need not present a problem, since it is advisable to associate correction values with the articulation device and store them in the computer of the coordinate-measuring instrument. These correction values can be obtained in a prior calibration process. Similarly, angular deviations of the angle-measuring devices can be determined in an initial calibration process and can be later corrected by the computer.

For least possible uncertainty in measurement, it is furthermore necessary to effect the transmission of drive torque to rotatable parts of the articulating head with as little transverse reaction force as possible. To this end, it is proposed to employ a belt or strap transmission which can also act as a slip clutch in the event of a collision, thereby preventing damage to the articulating head.

Angle encoders for rotation about the axes of the articulation device are advantageously absolute measurement systems, or they are incremental-measurement systems having an additional reference mark which reproducibly determines the zero point of an index circle.

In order that values obtained via articulated orientation of a probe can at all times be included in a dynamic operation of the entire instrument, i.e., within the measurement result given by the linear-measurement scales of the coordinate-measuring instrument, it is advisable to provide the articulation device with its own coordinate system wherein position and orientation with respect to the machine-coordinate system are unequivocally determined. Position and angular orientation of this coordinate system depend on the particular installation of the articulating head in the measurement arm of the coordinate-measuring instrument and are advisedly determined in a calibration process after installation.

With the indicated procedure, it is sufficient only once to calibrate the position of the work-contacting probe ball in the coordinate systems of the measurement machine. For every other angular orientation, data stored in the computer are sufficient to correct position and orientation of the axes of the articulating head. Calibration for each of a large number of different detent positions for each probe, as is necessary in articulation devices of the prior art, is therefore unnecessary with the present invention.

DETAILED DESCRIPTION

The invention will be described in detail in conjunction with the accompanying drawings, in which.

Figure 1:
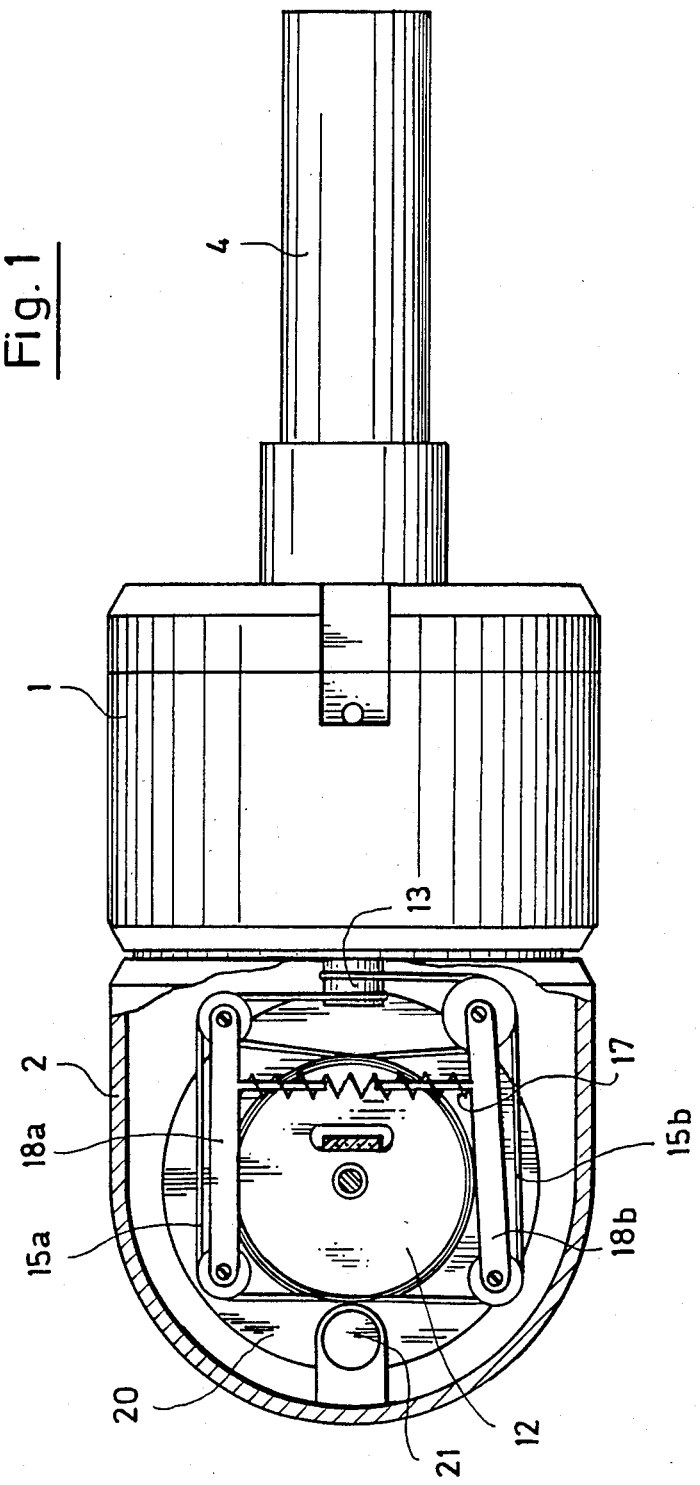
FIG. 1 is a side view in elevation for an articulating head of the invention, the same being partly broken-away and in section, at the plane designated II in FIG. 2.
Figure 2:
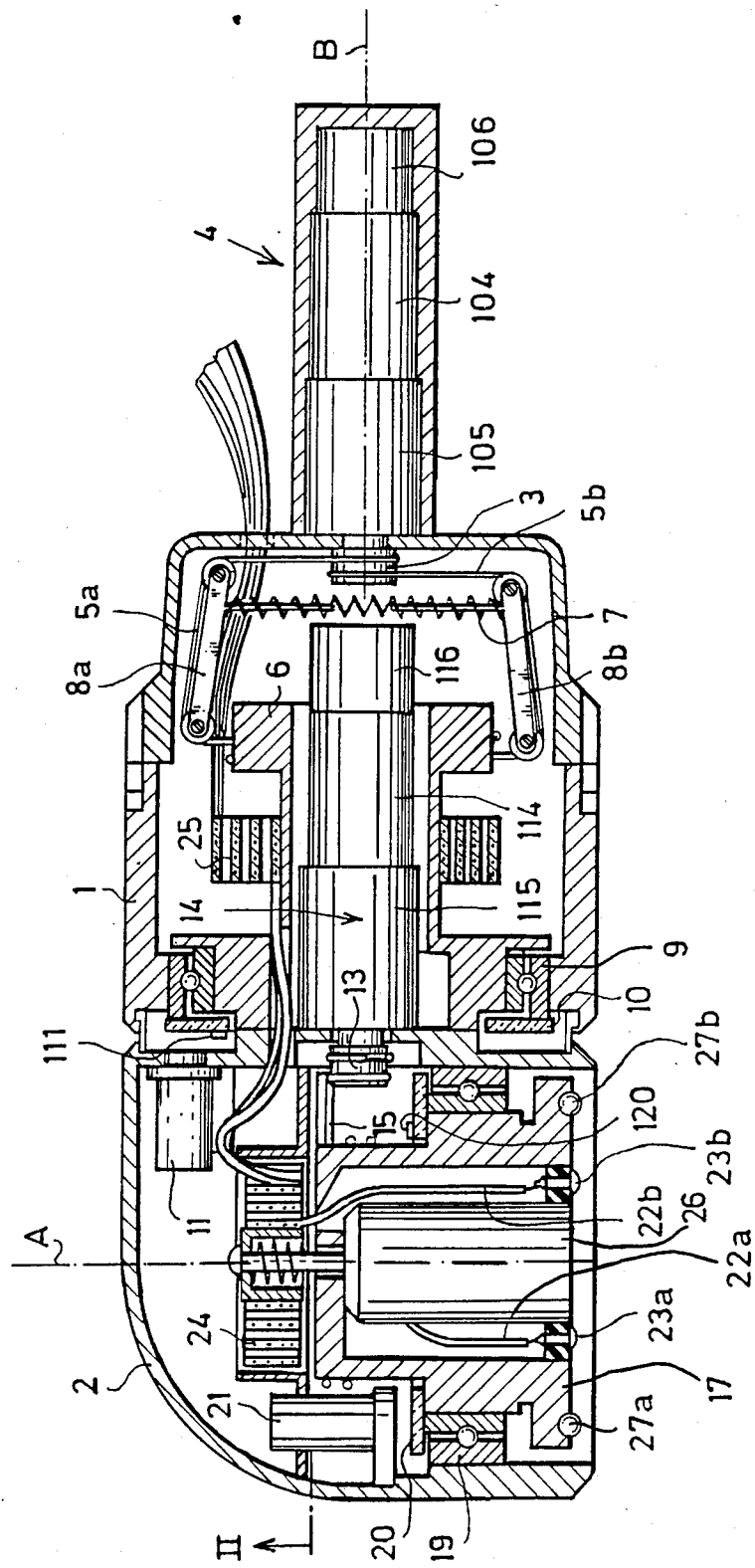
FIG. 2 is a longitudinal section through the articulation device of FIG. 1, taken in a plane at 90° offset (about axis B), i.e., normal to the section plane of FIG. 1.

In FIGS. 1 and 2, which show internal structure of a two-axis articulating head of the invention, a cylindrical housing part 1 is adapted to be mounted to a measuring machine. At one end of housing part 1, a housing part 2 is rotatable about a longitudinal axis B of symmetry, via drive means 4 at the other end of cylindrical part 1. Within housing part 2, a cup-shaped chuck receptacle 12 is rotatable about a second axis A; receptacle 12 accommodates a chuck 26 to which the probe or probe holder of a coordinate-measuring instrument can be mounted, in a manner which will later be described. The axes A and B are orthogonally related, the axis A being sometimes referred to as the "swivel" or "swing" (Schwenk) axis, and the axis B being sometimes referred to as the "rotating" or "turn" (Dreh) axis.

Drive 4 consists of a motor 104 with attached tacho-generator 106, and a transmission 105 having output to a belt-drive drum 3. Drum 3 is of relatively small diameter and is connected via belt courses 5a and 5b to a relatively large-diameter annular drum 6 for driven rotation of the part 2. A compression spring 7, in combination with with two belt-tension levers 8a and 8b, assures that the belt courses, which are in opposite directions of wrap around drum 6, are under uniform tension. The described belt-drive configuration will be seen to avoid development of misaligning forces on antifriction-bearing means 9 by which rotatable articulation part 2 is mounted, even though the fixed housing part 1 carries the means of torque delivery.

For measurement of the angle of rotation of part 2, (with respect to part 1), an angle encoder in the form of an annular index-divided disc 10 on part 1 is scanned by an optoelectronic reading head 11 on part 2. Disc 10 includes a zero-pulse mark 111 which will be understood to be scanned by a corresponding transmitter (not shown) and to supply an initialization pulse for fixing the zero position of this angle-measuring system.

Within the bore of drum 6, a second drive unit 14 is mounted to the rotatable part 2. This second drive unit also consists of a motor 114, a tacho-generator 116 and a transmission 115. A second belt drive has two courses 15a and 15b connecting a small-diameter drum 13 of the drive 14 to the rotatable chuck receptacle 12 and its chuck 26, for the probe pin or probe holder which is to be selectively attached thereto. Chuck receptacle 12 is mounted via ball bearing means 19 for rotation about axis A in the housing part 2 and has the shape of a cupped hollow cylinder 17; and the belt drive 15a and 15b is wrapped around the relatively large-diameter outer circumference of cylinder 17.

A second annular index-divided disc 20 with a zero-pulse mark 120 thereon serves, in combination with a second optoelectronic reading head 21, to measure the angle of rotation of chuck receptacle 12 about axis A.

Within the bore of receptacle 12, a chuck having an electromagnet is mounted for action along axis A and within a sleeve 26. This electromagnet serves for releasably secured mounting of the base or support plate (not shown) of a work-contacting probe pin, with the support plate deriving locating reference from three equally spaced balls 27. Such an electromagnetic chuck or probe-pin change device is known per se and is illustratively described in U.S. Pat. No. 4,637,119, so that its further description is not necessary.

Around sleeve 26, plural electrical contacts 23 are arranged at the base plane of receptacle 12, said contacts serving to transmit work-contact signals from an attached probe-pin base (or probe-holder base) to the coordinate-measuring instrument. Flexible multiple-conductor ribbon cabling 22a, 22b for contacts 23 is formed in spiral-wrap packages 24, 25 around the axes A and B; these packages are of several turns each, in order to avoid tensile stress during articulating displacements of parts 2 and 12 about their respective axes B, A of rotation.

Antifriction bearings 9 and 10 are preferably high-precision ball bearings which are preloaded, free of play and exhibit reproducible travel behavior. Such behavior is particularly important for the determination of a measured value via the articulated device, since a computer can correct measured values, using travel-error data which has once been determined, and uncertainty of the measurement is thus reduced. Suitable antifriction bearings for the indicated purposes may be as described in European Pat. No. 0,111,125.

Figure 3:
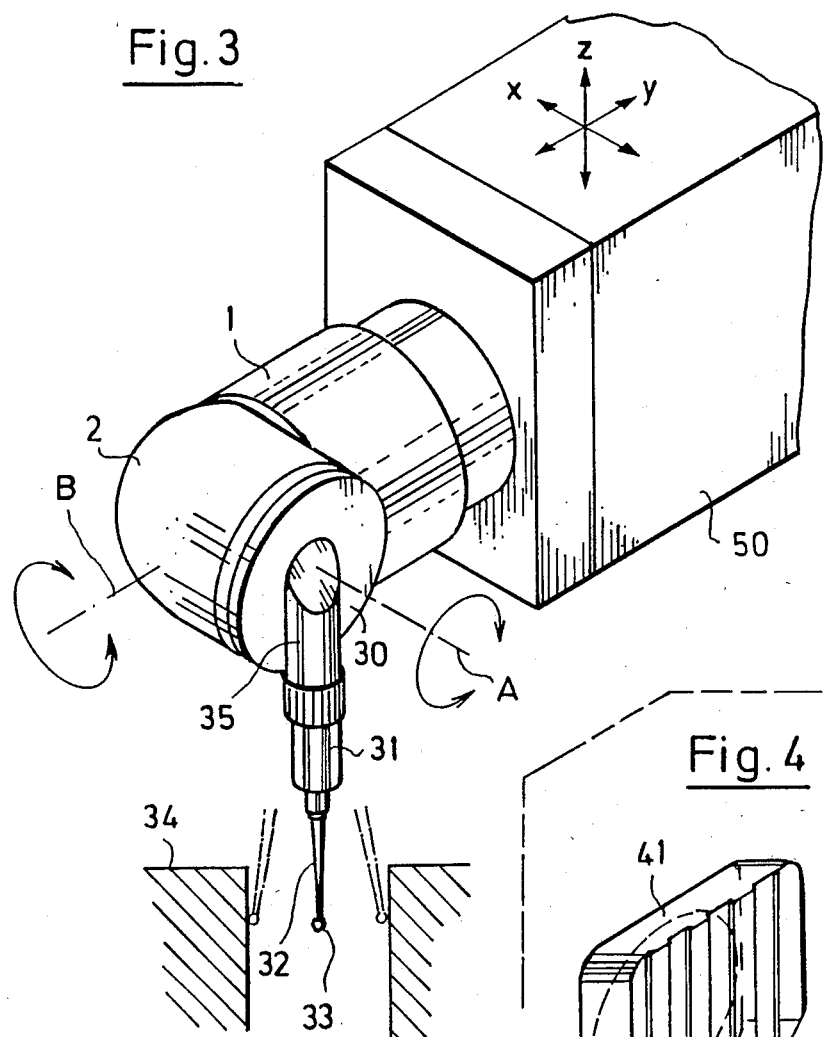
FIG. 3 is an isometric view of the articulating head of FIGS. 1 and 2, equipped with a probe head and probe, in operative relation to a workpiece feature to be measured.

The articulating head shown in detail in FIGS. 1 and 2 is illustratively mounted, in the manner shown in FIG. 3, to the transverse arm 50 of a column-type measuring machine. In this connection, the rearwardly extending drive end 4 of rotary axis B is concealed within the measurement arm 50.

In the view shown, a probe holder 31 of the switching type is chucked to the receptacle 12 of the articulation head. The probe holder 31 may illustratively be as described in applicant's pending application Ser. No. 105,825, filed Oct. 8, 1987, entitled "Means for Simultaneously Connecting a Plurality of Switch-Type Probe Heads to the Measurement Arm of a Coordinate-Measuring Machine". The probe holder 31 is secured by an adapter 35 to a base plate 30 which, in its turn, is provided with groove or other locating support formations which seat on balls 27 of the chucking receptacle 12 of the articulating head.

Figure 4:
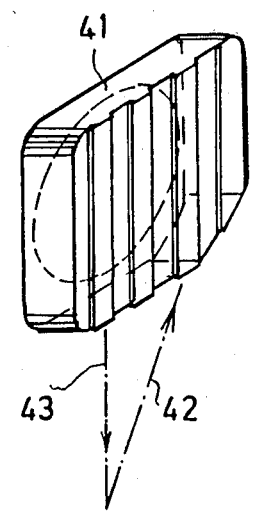
FIG. 4 is a perspective view of an optical probe element adapted to be mounted to the articulation device of FIG. 1, in place of element (31) in FIG. 3.

It is also possible to have chucking receptacle 12 mount other probe systems, such as the optical triangulation probe 41 of FIG. 4 (i.e., a probe which does not contact the workpiece, and which therefore avoids need for a probe pin 32 with its ball tip 33, for contacting the workpiece 34), or to interchangeably mount two different probe systems to the chucking receptacle 12. Triangulation probes, as at 41, rely upon emission of a laser beam 43 to impact the surface of the workpiece, and the point of impingement is evaluated by an optical system which is inclined at 42 to the illuminating beam 43. Such triangulation probes are known from European Pat. Nos. A1-0,156,991 and/or A1-0,163,347 and therefore need no further discussion.

Figure 5:
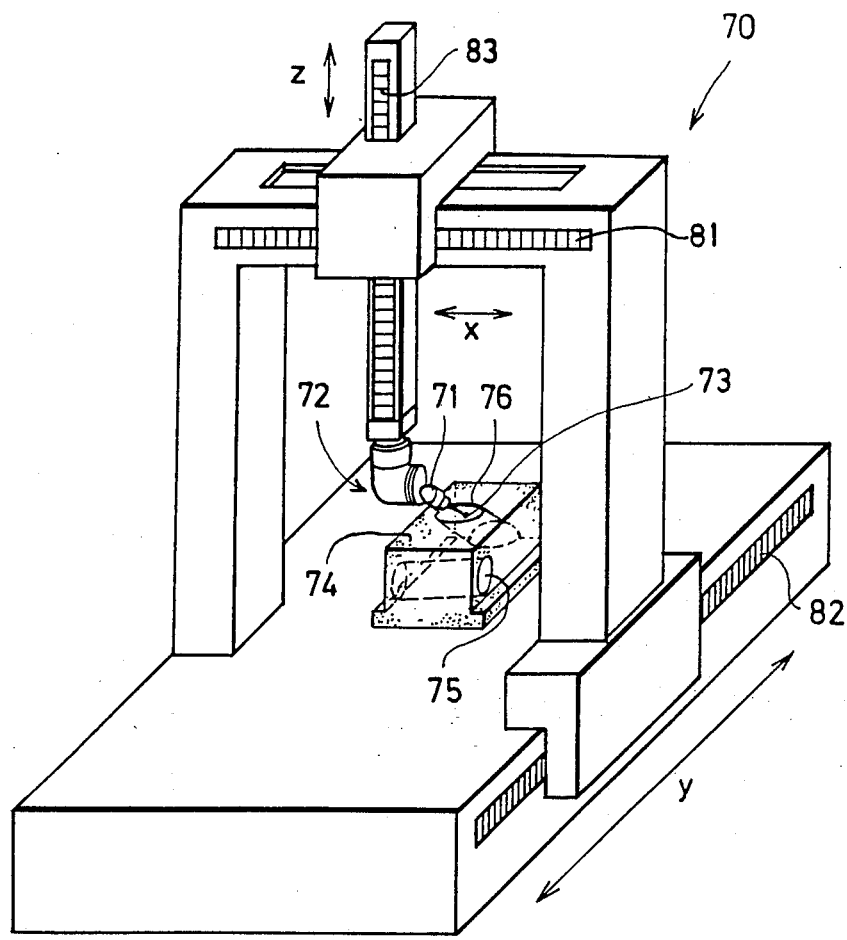
FIG. 5 is an isometric overall view of a coordinatemeasuring instrument provided with the articulating head of FIG. 1.

FIG. 5 shows an articulating head 72 of FIGS. 1 and 2 mounted to the lower end of the vertical arm 83 of a coordinate-measuring machine 70 of portal construction. As can be noted from the drawing, a workpiece 74 has bore holes 75 and 76 on differently oriented alignment axes which are nevertheless accessible for work-contacting measurement via a probe system 71 mounted to the articulating head 62, the measurements being facilitated by conjunctive operation of the respective polar and orthogonal coordinate-displacement systems of the articulating head 72 and of the multiple-coordinate machine 70. In this connection, two modes of operation are basically possible:

In a first mode, articulating head 72 serves to direct its mounted probe tip 73 into the desired angular positions. A work-contacting program then proceeds by movement of orthogonal machine drives X, Y and Z, associated with rectilineal measuring systems 81, 82 and 83.

In a second mode, the coordinate measuring machine 70 illustratively and successively positions probe holder 71 in the bore holes 75, 76 of the workpiece and a scanning program proceeds while linear drives are arrested; scanning proceeds solely pursuant to programmed rotary displacement about the respective axes A, B, thereby effecting a programmed course of orientation of the probe holder 71 by means of articulating head 72. The advantage of this mode of operation lies (a) in greater speed of measurement due to very much smaller masses to be moved and (b) in increased precision of measurement.

Figure 6:
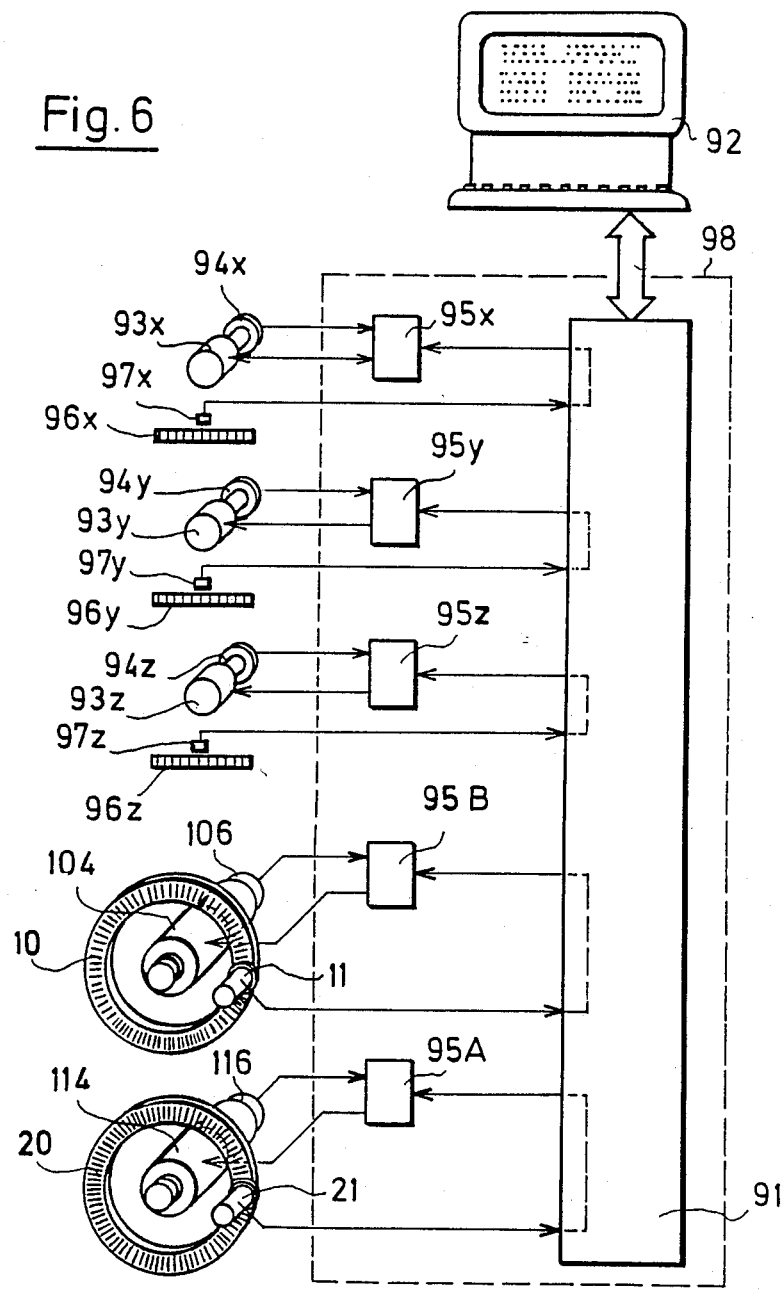
FIG. 6 is a schematic diagram of a control system for the coordinate-measuring instrument of FIG. 5.

FIG. 6 is a simplified schematic to show a control system for the coordinate-measuring machine of FIG. 5, wherein the heart of the control electronics 98 is a microprocessor system 91, connected to the control computer 92 of the coordinate-measuring machine by a data bus. Drives 93x, 93y and 93z, for the linearly moved parts of the coordinate-measuring machine and for tacho-generators 94x, 94y and 94z associated with the respective drives, are included via the circuits 95x, 95y and 95z in speed-control circuits which are controlled by the microprocessor.

For each of the orthogonal directions of machine displacement, a position-control circuit includes a linear-measurement scale (96x, 96y, 96z) and/or its measurement-value transmitter or reading device (97x, 97y, 97z) producing signals which electronically coact with the microprocessor and the associated speed-control circuit.

Control for the respective rotary displacements of the articulating head is constructed in the same manner. Tacho-generators 106 and 116 associated with drive motors 104 and 114 for angular displacement about axis B and/or about axis A are components of separate angular speed-controlled drives, via feedback-control circuits 95A and 95B. Position-control circuits which include the respective angle encoders 10/11 and 20/21 of the articulating head electronically coact with the microprocessor and with the respective angular-speed control circuits.

Figure 10:
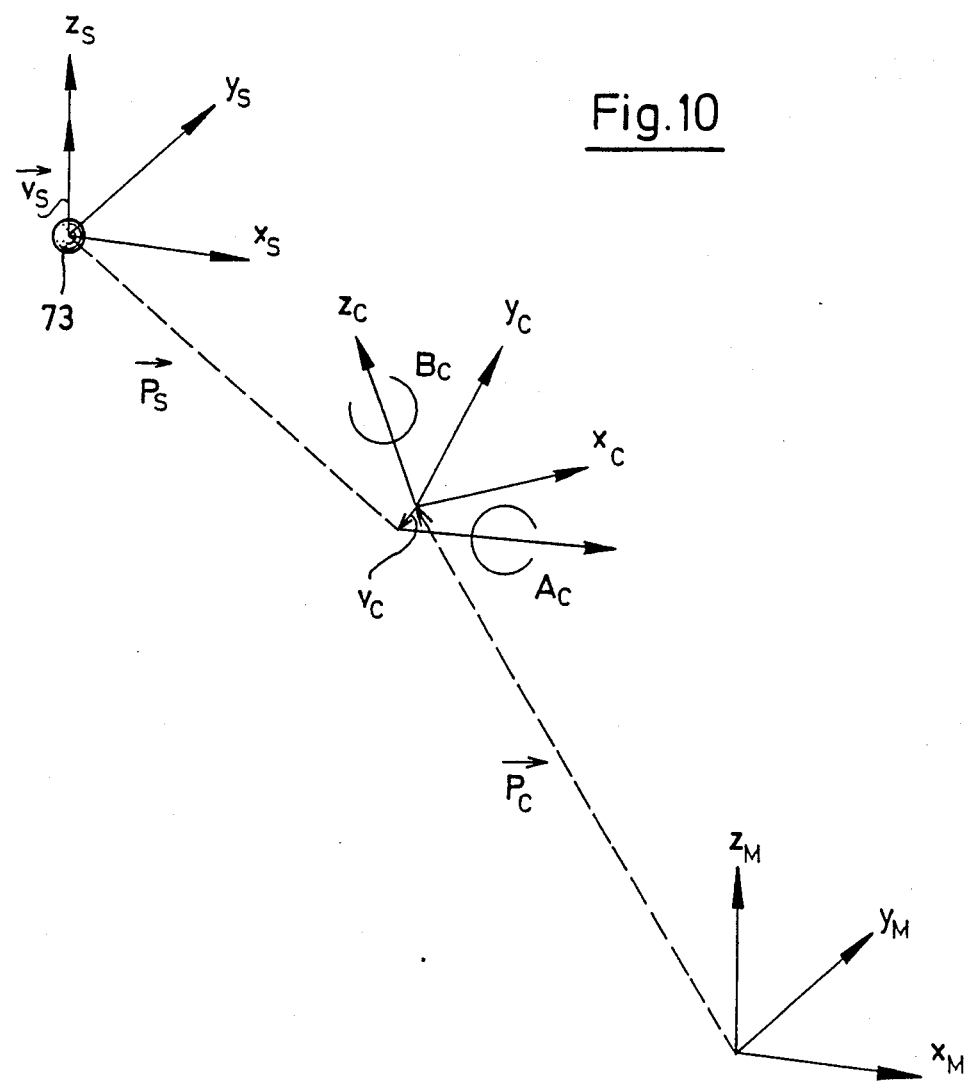
FIG. 10 is a sketch explaining the positional relationship between the coordinate system of the articulating probe holder device and the coordinate system of the associated coordinate-measuring instrument.

FIG. 10 is useful in a description of calibration and alignment procedure, to assure that exact measurement values or scanning coordinates of a probe-tip ball (mounted to the articulating head) derive from linear measurement values, e.g., from scale readings at 96/97 (x, y, z), and from angle-measurement values, e.g., from encoders 10/11 and 20/21.

Component value of machine-coordinate measurements relate to the orthogonally related linear guides of the coordinate-measuring machine, the same being pursuant to a first coordinate system, directionally symbolized $\vec{X}_M$, $\vec{Y}_M$ and $\vec{Z}_M$. And for the articulating head, it is advisable to introduce a second coordinate system which is similarly directionally symbolized $\vec{X}_C$, $\vec{Y}_C$ and $\vec{Z}_C$.

The point of origin of this second coordinate system is offset as compared with a given point of origin for the first coordinate system by a distance which can be directionally described $\vec{P}_C$. Furthermore, this second coordinate system is angularly offset with respect to the first coordinate system as a function of its installed orientation, which can be described by the rotational matrix $D_B$.

For simplicity, let it be assumed that the coordinate direction $\vec{Z}_C$ of the articulating-head coordinate system coincides with the rotary axis B of the articulating head. The other axis A of the articulating head should, ideally, intersect axis B at a right angle, but this cannot always be achieved in manufacture. In fact, in actual practice there is a slight offset distance with which the two axes pass each other. But deviations from a right-angle relation between these two axes can be taken into account by calibration data for the non-parallel orientation of the axis $A_C$ with respect to orthogonal-axis coordinate system $\vec{X}_C$, $\vec{Y}_C$ and $\vec{Z}_C$ of the articulating head.

A third or transforming coordinate system can now be associated with the probe ball of a probe pin mounted to the probe head; this third coordinate system is at a distance $\vec{P}_S$ from the axis A in the coordinate system of the articulating head. The orientation of this third coordinate system $\vec{X}_S$, $\vec{Y}_S$ and $\vec{Z}_S$ is dependent on the instantaneous articulated angular position about each of the two axes A and B. For a suitable transformation, it is advisable to introduce the dynamic rotational matrices $D_A$ and $D_B$ by which the orientation of the third coordinate system is established.

On basis of the above analysis, it follows that a so-called "dynamic probe coordinate" can be introduced which is calculated in accordance with the following matrix equation:

$$\vec{D} = \vec{P}_C + D_C [D_B \cdot (D_A \cdot \vec{P}_S + \vec{V}_C)], \qquad \text{I}$$

wherein $\vec{P}_S$, $\vec{V}_C$ and $D_C$ are parameters which, as will be described below, must be obtained by calibration processes. The angle-measurement values of encoders 10/11 and 20/21 of the articulating head enter into the dynamic rotational matrices $D_A$ and $D_B$, while the measured values of the linear measurement scales of the coordinate-measuring machine enter into the $\vec{P}_C$ vector, i.e.

$$\vec{P}_C = \vec{P}_O + \begin{pmatrix} x \\ y \\ z \end{pmatrix}, \qquad \text{II}$$

wherein $\vec{P}_O$ describes the distance of the (zero point) origin of the coordinate system of the articulating head from the (zero point) origin of the coordinate system of the measurement machine (without the articulating head).

With a knowledge of the above-indicated parameters, it is thus possible to calculate the contact coordinates of the work-contacting probe ball 73 (FIG. 5) at any and all times, using measured values of the linear-measurement scales and of the axis-B (Dreh) transmitter 11. In this connection, it must be appreciated that the Equation I above applies to a probe ball of spherical symmetry. If the optical triangulation probe of FIG. 4 is used for beam-contact evaluation of the workpiece, then the offset-distance measurement value $\vec{V}_S$ determined with this probe in the probe-coordinate system $\vec{Z}_S$, $\vec{Y}_S$, $\vec{X}_S$ must be added to the equation; this offset-distance can be expressed in Equation I by substituting $(\vec{P}_S+\vec{V}_S)$ for $\vec{P}_S$.

Orientation of the axis $A_C$ in the coordinate system of the articulating head as well as the distance $\vec{V}_C$ between the two axes of the articulating head can be determined, prior to machine installation of the articulating head, illustratively by mounting the articulating head in a jig 52 (as sketched in FIG. 7), and by subjecting the articulating head to acceptance testing on a separate coordinate-measuring machine. In this connection, a base plate having an arm 56 which positions a ball 57 eccentric to both of the axes A and B is clamped to the receptacle 12 of the articulating head.

The position of each of the two axes A and B is determined by measuring the position of ball 57 for different angularly spaced positions in the course independent rotation about each of the respective axes A and B. In such rotation, the ball center travels on one of the two circular paths designated 58 and 59. The true orientation of each of the axes A and B is the normal to that circular plane through the center of the circle which best fits the measurement points. This method of determining the axial position is known per se and is illustratively described in U.S. Pat. No. 4,369,581.

In order to reduce uncertainty in the measurement of angle values supplied by the articulating head, it is further advisable to determine the travel errors of the antifriction bearings of the articulating head and/or the indexing errors of the angle encoders. In this connection, applicant's method may be used as described in U.S. application, Ser. No. 116,509, filed Nov. 2, 1987, entitled "Method of Measuring Rotary Table Deviations" can be used.

Figure 7:
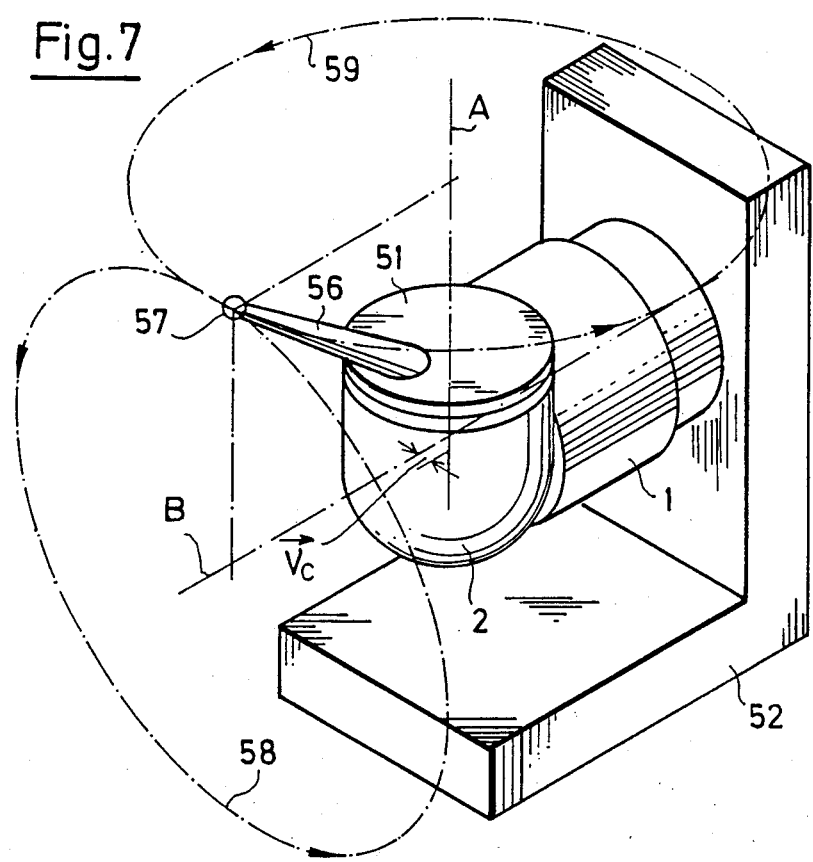
FIG. 7 is an isometric view of the articulating head of FIGS. 1 and 2 in a holding mount, in order to illustrate a first calibration member (51) for use in a calibration process for the respective rotary axes of the device.
Figure 8:
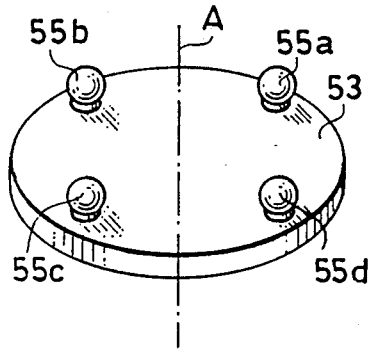
FIG. 8 is a perspective view of a second calibration member (53) for determining deviations in travel of the bearings of the articulation device, the second member (53) being a replacement for the calibration member (51) in FIG. 7.
Figure 9:
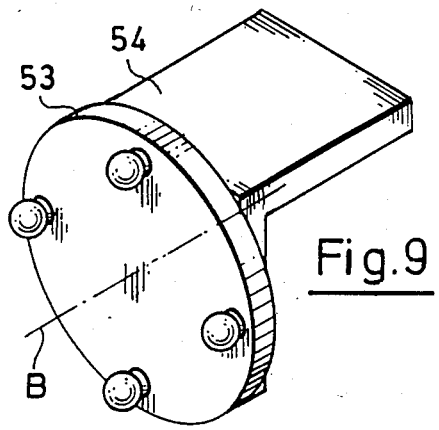
FIG. 9 is a perspective view to show the calibration member (53) of FIG. 8 with an attached angle adapter.

To determine these travel errors, a base plate 53 (FIG. 8) is substituted for plate 51 of FIG. 7, being clamped to the chucking receptacle 12 of the articulating head. Plate 53 has four balls 55a–d, fixedly mounted at equal angular spacing. The center points of the balls are then measured for a very large number of angular positions about axis A, and from these measurements, deviations in travel are determined for the cycle of rotation about axis A, and/or deviations in angular position for encoder 20/21 are determined for the cycle of rotation about axis A. In the same way, these deviation errors are then determined for rotation about axis B, the plate 53 being clamped, via the intermediary of a right-angle adapter plate 54, to the chucking receptacle 12 of the articulating head, thereby centering the locus of balls 55 on axis B. It is to be understood that the use of measured values obtained in this way to correct for travel errors of the bearings admittedly presupposes that such errors are reproducible, i.e., exhibit a long-period behavior; for this reason, high-precision axially preloaded bearings are recommended for suspension on the rotary axes A and B.

Once distance and position of the two axes A and B with respect to each other in the coordinate system of the articulating head have been determined, and once their errors in travel have been determined, as described above, it is necessary to determine the position of the coordinate system of the articulating head in its installed condition relative to the coordinate system of the multiple-coordinate measuring machine, i.e., to determine the position vector $\vec{P}_O$ in Equation II and the rotational matrix $D_C$ in Equation I. The corresponding six unknowns can be obtained by recording a corresponding number of measurement values at different angular positions of a probe holder mounted to the articulating head, in the course of scanning a geometric element of known position and dimension. In general, this is done by placing a calibration cone or cube in a specific position within the measurement space of the coordinate measuring machine, and then by effecting a course of scanning the same. If the vector $\vec{P}_S$ is also unknown, i.e., the position of the probe ball in the coordinate system of the articulating head is not available, then these values can be obtained in one and the same calibration process by simply increasing, by at least three, the number of measurement points to be scanned.

Figure 11:
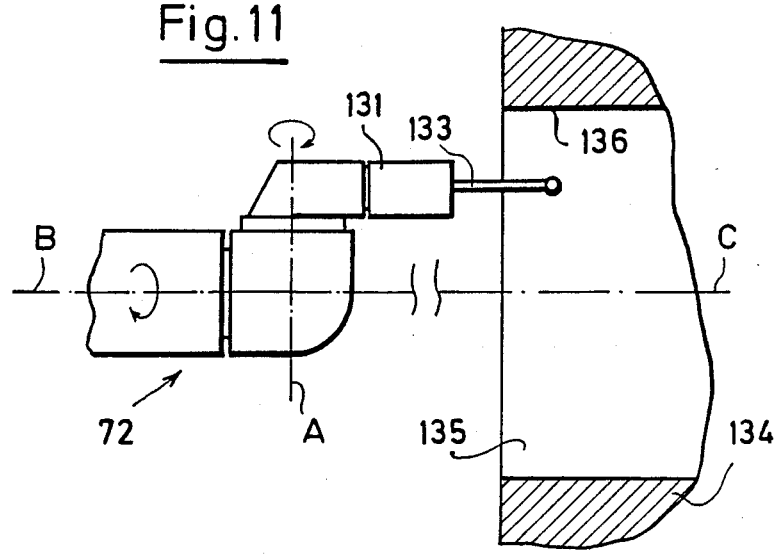
FIGS. 11 and 12 are simple sketches to illustrate use of the articulating head and associated probe holder for testing the shape of a drilled hole.

If, after performing the above-described calibrating processes, the articulating head with attached probe holder is used for measurement tasks, the control computer 92 of the coordinate-measuring machine is then in a position to calculate actual coordinates for each scanning point, using (a) the measured values of the linear measurement scales of the coordinate-measuring instrument, (b) the angle-encoder values of the articulating head, and (c) stored correction values corresponding to Equation I, regardless of whether the scanning process is brought about by a rectilinear movement or a rotational movement of the probe head In addition to using the articulating head in a program of making spaced point-contact measurements along desired regions of the workpiece, it is to be understood that it is also possible to use the articulating head for shape testing by continuous scanning of the workpiece. The latter technique is particularly suitable for shape testing of circular or cylindrical surfaces such as bore holes. A typical case of such use is shown in FIG. 11. To test the shape of the inside 136 of the bore hole 135 in a workpiece 134, the articulating head 72 mounted to an arm of the coordinate-measuring machine is so positioned that the rotary axis B of the articulating head is approximately aligned with the axis (C) of the bore hole 135. Surface 136 is then contacted by swinging probe holder 131 about axis A until the ball of the probe pin 133 rests against the surface 136. By rotating the articulating head about axis B, the shape of the bore of hole 136 is then digitally traced.

Figure 12:
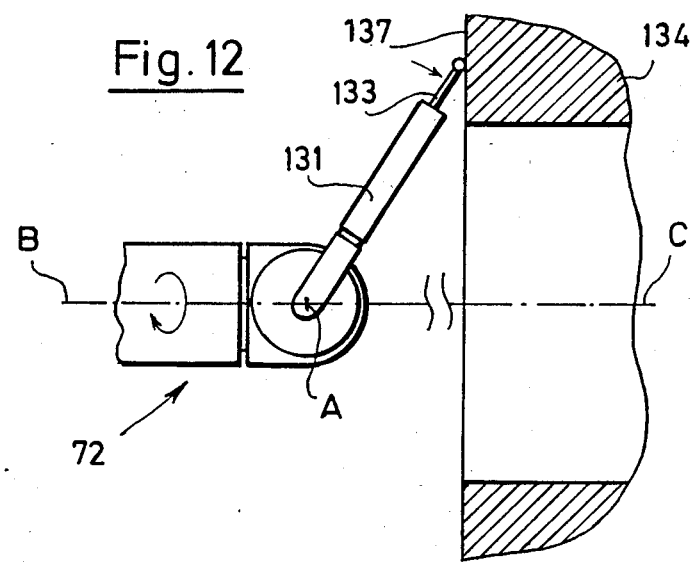

In similar manner, one can use the articulating head to test the planarity of a workpiece surface 137 perpendicular to the axis C of the bore hole (FIG. 12). Here also, workpiece contact is effected by rotation of probe pin 133 about axis A, and planarity is tested by orbital rotation of the probe pin about axis B when aligned with the bore-hole axis C.

In another mode of operation, shape testing can also be effected on bore holes which extend in different directions. In such cases, the point of intersection of the two articulation axes A and B is positioned on the axis of the corresponding bore hole, and the bore hole is then scanned and traced by simultaneous coordinated rotation about both axes, A and B.

In performing the shape-testing operations, multicoordinate probe heads of the so-called measuring type can be used. Also usable are unidimensionally acting pivoted-lever or indicator probes, or contactless measuring optical or capacitive distance sensors.

Since the machine axes of the coordinate-measuring machine are stationary during these measurements, the accuracy in measurement obtainable is determined solely by any uncorrected errors of the articulating head and of the probe pin and its holder.

What is claimed is:

1. As an article of manufacture, a two-axis articulating accessory head adapted for mounting to the probe-supporting arm of an existing coordinate-measuring machine wherein the machine includes multiple-coordinate drives for probe positioning via said arm, and a programmable computer providing data storage and coordinated drive control, said accessory head comprising:

a first housing part having a first axis via which said part is adapted at one end to be removably mounted to an existing probe-supporting arm;

a second housing part mounted for rotation about said first axis adjacent the other end of said first housing part;

first positioning means coacting between said housing parts and providing the sole means of controlling instantaneous angular positioning of said second housing part about said first axis, said first positioning means including (a) first drive means having first means of computer-generated input-signal connection, and (b) angle-encoding means coacting between said housing parts and providing for computer connection of an encoded electric-signal output reflecting instantaneous angular-position data about said first axis;

probe-holder means mounted by said second housing part for rotation about a second axis orthogonal to said first axis; and second positioning means coacting between said probe-holder means and said second housing part and providing the sole means of controlling instantaneous angular positioning of said probe-holder means about said second axis, said second positioning means including (c) second drive means having second means of computer-generated input-signal connection, and (d) angle-encoding means coacting between said probe-holder means and said second housing part and providing for computer connection of an encoded electric-signal output reflecting instantaneous angular-position data about said second axis.

2. The article of claim 1, in which said first drive means comprises a first motor having a rotary output drum on said first axis, a driven-drum part of said second housing, said driven-drum part being concentric with said first axis, and a first belt drive engaged for torque transmission from said motor-output drum to said driven-drum part.

3. The article of claim 1 or claim 2, in which said second drive means comprises a second motor having a rotary output drum on said first axis, in which said probe-holder means has a driven-drum part which is concentric with said second axis and which is diametrically traversed by a geometric projection of said first axis, and a second belt drive so engaged for torque transmission from said second-motor output drum to the driven-drum part of said probe-holder means as to minimize off-axis force reaction between said housings.

4. In a computer-operated multiple-coordinate measuring machine, wherein orthogonally related guides, slides and drives serve for programmed positioning of a probe holder and its work-contact probe in respect of predetermined regions to be measured on a workpiece, and wherein work-contact measurement data are entered into computer storage, the improvement wherein the probe holder is a two-axis articulating head, said head comprising:

a first housing part having a first axis of mounting at one end to said machine;

a second housing part mounted for rotation about said axis adjacent the other end of said first housing part;

first computer-controlled drive means coacting between said housing parts and providing the sole means of controlling instantaneous angular positioning of said second housing part about said first axis, said first drive means including angle-encoding means coacting between said housing parts and continuously providing an encoded electric-signal output to said computer reflecting instantaneous angular-position data about said first axis;

probe-holder means mounted by said second housing part for rotation about a second axis orthogonal to said first axis; and second computer-controlled drive means coacting between said probe-holder means and said second housing part and providing the sole means of controlling instantaneous angular positioning of said probe-holder means about said second axis, said second drive means including angle-encoding means coacting between said probe-holder means and said second housing part and continuously providing an encoded electric-signal output to said computer reflecting instantaneous angular-position data about said second axis.

5. The improved machine of claim 4, in which each angle-encoding means and its associated drive means are so integrated into the computer of the multiple-coordinate measuring machine that a preset orientation of said probe-holder means is maintained solely via said drive means of the articulating head.

6. The improved machine of claim 4, in which each angle-encoding means and its associated drive means are so integrated into the computer of the multiple-coordinate measuring machine that solely via said drive means a targeted program of probe contact on a workpiece to be measured may proceed from a selected one of a plurality of universally available orientation in space.

7. The improved machine of claim 4, in which the respective mountings for rotation about said first and second axes are in precision rotary bearings having reproducible behavior in rotation about said axes, and in which precalibration correction values for the reproducible rotational behavior of said bearings have been entered into computer storage.

8. The improved machine of claim 7, in which the correction values reflect deviations in angular position, and deviations in rotary travel about the respective axes.

9. The improved machine of claim 7, in which the correction values reflect deviations in angular position, angular-position errors of the respective axes, and deviations in rotary travel about the respective axes.

10. The article of claim 1 or the improved machine of claim 4, in which each of said angle encoding means is an absolute-measurement system.

11. The article of claim 1 or the improved machine of claim 4, in which each of said angle-encoding means is an incremental-measurement system having at least one additional reference mark.

12. The article of claim 1 or the improved machine of claim 4, in which said probe-holder means is a chucking receptacle, and a probe holder retained by said chucking receptacle and having means for mounting a probe having a work-contact ball at a location of eccentric offset from both said axes.

13. The method of making measurements on a workpiece, using a multiple-coordinate measuring machine wherein orthogonally related linear guides, slides and drives serve for positioning of a two-axis articulating probe-holder head having independent rotary positioning drives for selectively positioning a mounted probe about each of two orthogonally related rotary axes, said method comprising mounting the workpiece in spaced relation to the mounted probe but within range of probe contact when displayed and positioned solely by at least one of said rotary drives, and performing a measurement on the workpiece solely via probe displacement of said at least one of said rotary drives and when the probe is in contact with the workpiece.

14. The method of claim 13, in which, to test the shape of a circular or cylindrical surface, one rotary axis of the articulating head is first positioned by said drives into coincidence with the axis of symmetry of the surface to be tested, then the surface to be tested is contacted by driven rotary displacement of the probe about the other axis of rotation, and then a circular scan of the surface is effected by driven rotary displacement of the probe about said one axis of rotation.

15. The method of claim 13, wherein the orthogonally related rotary axes intersect, and in which, to test the shape of a circular or cylindrical surface having an axis of symmetry, the articulating head is first positioned by said drives into a position in which the point of intersection of its axes is on the axis of symmetry of the surface, and then the surface to be tested is scanned by coordinated simultaneous driven displacement of the probe about both axes of rotation.

16. The method of coordinate measurements on a workpiece, using a computer-controlled coordinate-measuring machine having an articulating head with a probe mounted thereon, said machine having a rectilineal coordinate system ($X_M$, $Y_M$, $Z_M$) and separate linear drives within said system for orthogonally related relative displacement of said head and a workpiece to be measured, and said head having two orthogonally related articulation axes (A, B) with separate rotary drives for displacement of the mounted probe about the respective articulation axes, said method comprising the steps of:

(a) performing a calibration procedure to determine installation-independent deviations in angular geometry and/or travel in the course of rotation about the axes of the articulating head, and entering said deviations as correction values in the computer of the coordinate-measuring machine;

(b) determining installation-dependent values by:

(b$_1$) establishing a separate coordinate system ($X_C$, $Y_C$, $Z_C$) which is associated with articulating displacement of the head;

(b$_2$) positioning a geometrical body of known dimension within said separate coordinate system;

(b$_3$) scanning and measuring the geometrical body via the head-mounting probe for measurement values at several angular positions of rotation about the articulation axes (A, B);

(b$_4$) ascertaining from the measurement values separate determinations of the position vector $\vec{P}_C$ and of the angular offset $D_C$ for the machine-coordinate system ($X_M$, $Y_M$, $Z_M$) with respect to the articulating-head coordinate system ($X_C$, $Y_C$, $Z_C$);

(b$_5$) determining the coordinate vector $\vec{P}_S$ and radial measurement r of the probe as parameters in the coordinate system of the articulating head; and (b$_6$) feeding thus-determined values computer of the coordinate-measuring machine; and (c) in subsequent measurement of unknown workpieces, making a correction for each calculation of the actual position measured by probe coaction with workpiece surfaces, wherein the correction accounts for the following:
  (i) rectilineal coordinate-measurement values in the machine-coordinate system ($X_M$, $Y_M$, $Z_M$);
  (ii) the installation-independent correction values determined under step (a) above;
  (iii) the installation-dependent values determined under step (b) above; and
  (iv) the instantaneous measurement values for angular position about each of the axes (A, B) of the articulating head.

17. The method of claim 16, wherein calculation of the actual position measured by probe coaction with the workpiece surface is effected in accordance with the equation:

$$\vec{D} = \vec{P}_C + D_C \cdot [D_B \cdot (D_A \cdot \vec{P}_S + \vec{V}_C)]$$

wherein the variables have the following meaning:
$\vec{P}_S$ describes the location of the probe in the coordinate system of the articulating head,
$\vec{V}_C$ is the offset-distance vector by which the two axes of the articulating head fail to intersect,
$D_A$ is the rotational matrix which describes the measured angle of articulating rotation of the probe about the swing axis (A) of the articulating head,
$D_B$ is the rotational matrix which describes the measured angle of articulating rotation of the probe about the turn axis (b) of the articulating head,
$D_C$ is the rotational matrix which describes the rotational orientation of the coordinate system of the articulating head in the rectilineal coordinate system of the coordinate-measuring machine, and
$\vec{P}_C$ is the offset-location vector which describes the offset distance of the origin of the coordinate system of the articulating head in the machine-coordinate system.

18. A method for the coordinate measurement of workpieces, using a computer-controlled coordinate-measuring machine having an articulating head with a probe mounted thereon, said machine having a coordinate system ($X_M$, $Y_M$, $Z_M$) and separate linear drives within said system for orthogonally related relative displacement of said head and a workpiece to be measured, and said head having two orthogonally related articulation axes (A, B), said method being characterized by the fact that
  (a) those deviations in angular geometry and/or travel in the course of rotation about the axes of the articulating head which are independent of installation are determined in a calibrating process and entered as correction values in the computer of the coordinate-measuring machine;
  (b) a separate coordinate system ($X_C$, $Y_C$, $Z_C$) is associated with articulating displacement of the head, and a geometrical body of known dimension is positioned in the coordinate system of the measuring machine, and the geometrical body is scanned and measured by the head-mounted probe for several angular positions of rotation about the articulation axes (A, B);
  (c) from the measurement values separate determinations are made of the position vector $\vec{P}_C$ and of the angular offset $D_C$ for the machine-coordinate system ($X_M$, $Y_M$, $Z_M$) with respect to the articulating-head coordinate system ($X_C$, $Y_C$, $Z_C$), and the coordinate $\vec{P}_S$ and radial dimension r of the probe are determined as parameters in the coordinate system of the articulating head, determined values being fed to the computer of the coordinate-measuring machine; and
  (d) in subsequent measurement of unknown workpieces, each calculation of the actual position measured by probe coaction with workpiece surfaces takes into account the following data:
    (i) rectilineal coordinate-measurement values in the machine-coordinate system ($X_M$, $Y_M$, $Z_M$);
    (ii) the installation-independent correction values determined under step (a) above;
    (iii) the installation-dependent values determined under steps (b) and (c) above; and
    (iv) the instantaneous measurement values for angular position about each of the axes (A, B) of the articulating head.

* * * * *